(12) United States Patent
Evans et al.

(10) Patent No.: US 11,517,870 B2
(45) Date of Patent: Dec. 6, 2022

(54) SEGMENTED FLEXIBLE GEL COMPOSITES AND RIGID PANELS MANUFACTURED THEREFROM

(71) Applicant: Aspen Aerogels, Inc., Northborough, MA (US)

(72) Inventors: Owen R. Evans, Chelmsford, MA (US); Irene Melnikova, Plainville, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 17/470,617

(22) Filed: Sep. 9, 2021

(65) Prior Publication Data

US 2021/0402361 A1 Dec. 30, 2021

Related U.S. Application Data

(60) Continuation of application No. 15/367,986, filed on Dec. 2, 2016, now Pat. No. 11,118,026, which is a
(Continued)

(51) Int. Cl.
*C08J 9/28* (2006.01)
*B01J 13/00* (2006.01)
(Continued)

(52) U.S. Cl.
CPC ........ *B01J 13/0091* (2013.01); *B32B 3/266* (2013.01); *B32B 5/022* (2013.01); *B32B 5/18* (2013.01); *B32B 7/12* (2013.01); *B32B 27/12* (2013.01); *B32B 37/12* (2013.01); *B32B 37/20* (2013.01); *B32B 38/08* (2013.01); *C04B 35/01* (2013.01); *C04B 35/624* (2013.01); *C04B 35/82* (2013.01); *C04B 41/009* (2013.01);
(Continued)

(58) Field of Classification Search
USPC ................. 428/143, 156, 167, 141
See application file for complete search history.

(56) References Cited

U.S. PATENT DOCUMENTS 2,188,007 A 1/1940 Kistler et al.
4,363,738 A 12/1982 Kummermehr
(Continued)

FOREIGN PATENT DOCUMENTS

CN 1164222 A 11/1997
CN 1046491 C 11/1999
(Continued)

OTHER PUBLICATIONS

International Search Report and written opinion received in PCT Patent Application No. PCT/US2013/054289, dated Nov. 20, 2013, 8 pages.
(Continued)

*Primary Examiner* — Lynda Salvatore
(74) *Attorney, Agent, or Firm* — Christopher Stow; Paul A. Smith (57) ABSTRACT

The present invention describes various methods for manufacturing gel composite sheets using segmented fiber or foam reinforcements and gel precursors. Additionally, rigid panels manufactured from the resulting gel composites are also described. The gel composites are relatively flexible enough to be wound and when unwound, can be stretched flat and made into rigid panels using adhesives.

40 Claims, 7 Drawing Sheets

Related U.S. Application Data division of application No. 13/800,551, filed on Mar. 13, 2013, now Pat. No. 11,053,369.

(60) Provisional application No. 61/682,198, filed on Aug. 10, 2012.

(51) Int. Cl.

| | |
|---|---|
| *C04B 41/00* | (2006.01) |
| *C08J 9/40* | (2006.01) |
| *C04B 41/45* | (2006.01) |
| *B32B 3/26* | (2006.01) |
| *B32B 5/18* | (2006.01) |
| *B32B 5/02* | (2006.01) |
| *B32B 7/12* | (2006.01) |
| *B32B 27/12* | (2006.01) |
| *B32B 37/12* | (2006.01) |
| *B32B 37/20* | (2006.01) |
| *B32B 38/08* | (2006.01) |
| *C04B 35/624* | (2006.01) |
| *C04B 35/80* | (2006.01) |
| *C04B 35/82* | (2006.01) |
| *C08J 9/00* | (2006.01) |
| *C08J 9/36* | (2006.01) |
| *C04B 35/01* | (2006.01) |

(52) U.S. Cl.
CPC ...... *C04B 41/4503* (2013.01); *C04B 41/4537* (2013.01); *C08J 9/0085* (2013.01); *C08J 9/28* (2013.01); *C08J 9/365* (2013.01); *C08J 9/40* (2013.01); *B32B 2260/021* (2013.01); *B32B 2260/04* (2013.01); *B32B 2262/101* (2013.01); *B32B 2315/085* (2013.01); *B32B 2398/20* (2013.01); *B32B 2419/00* (2013.01); *C04B 2235/3418* (2013.01); *C04B 2235/5208* (2013.01); *C04B 2235/616* (2013.01); *C08J 2201/0502* (2013.01); *C08J 2205/026* (2013.01); *C08J 2383/04* (2013.01); *Y10T 428/2476* (2015.01); *Y10T 428/2481* (2015.01); *Y10T 428/24752* (2015.01); *Y10T 428/24802* (2015.01)

(56) References Cited

U.S. PATENT DOCUMENTS

| | | | |
|---|---|---|---|
| 4,447,345 A | 5/1984 | Kummermehr et al. |
| 4,463,043 A | 7/1984 | Reeves et al. |
| 4,619,908 A | 10/1986 | Cheng et al. |
| 4,667,417 A | 5/1987 | Graser et al. |
| 4,717,708 A | 1/1988 | Cheng et al. |
| 4,904,328 A | 2/1990 | Beecher et al. |
| 4,966,919 A | 10/1990 | William et al. |
| 4,992,127 A | 2/1991 | Kishi et al. |
| 5,037,859 A | 8/1991 | William et al. |
| 5,124,101 A | 6/1992 | Hirao et al. |
| 5,275,796 A | 1/1994 | Tollotson et al. |
| 5,306,555 A | 4/1994 | Ramamurthi et al. |
| 5,420,168 A | 5/1995 | Mayer et al. |
| 5,565,124 A | 10/1996 | Balzano |
| 5,565,142 A | 10/1996 | Deshpande et al. |
| 5,691,392 A | 11/1997 | Okoroafor et al. |
| 5,786,059 A | 7/1998 | Frank et al. |
| 5,789,075 A | 8/1998 | Frank et al. |
| 5,830,387 A | 11/1998 | Yokogawa et al. |
| 5,866,027 A | 2/1999 | Frank et al. |
| 5,962,539 A | 10/1999 | Perrut et al. |
| 5,972,254 A | 10/1999 | Sander |
| 5,973,015 A | 10/1999 | Coronado et al. |
| 6,040,375 A | 3/2000 | Behme |
| 6,068,882 A | 5/2000 | Ryu |
| 6,080,475 A | 6/2000 | Frank et al. |
| 6,083,619 A | 7/2000 | Frank et al. |
| 6,087,407 A | 7/2000 | Coronado et al. |
| 6,136,216 A | 10/2000 | Fidler et al. |
| 6,140,377 A | 10/2000 | Schwertfeger et al. |
| 6,187,250 B1 | 2/2001 | Champagne |
| 6,197,270 B1 | 3/2001 | Sonada et al. |
| 6,315,971 B1 | 11/2001 | Wallace et al. |
| 6,479,416 B1 | 11/2002 | Frank et al. |
| 6,620,355 B1 | 9/2003 | Schmidt |
| 6,656,527 B1 | 12/2003 | Gessner et al. |
| 6,670,011 B2 | 12/2003 | Weinstein |
| 6,670,402 B1 | 12/2003 | Lee et al. |
| 6,770,584 B2 | 8/2004 | Barney et al. |
| 6,887,563 B2 | 5/2005 | Frank et al. |
| 6,989,123 B2 | 1/2006 | Lee et al. |
| 7,078,359 B2 | 7/2006 | Stepanian et al. |
| 7,399,439 B2 | 7/2008 | Lee et al. |
| 7,504,346 B2 | 3/2009 | Stepanian et al. |
| 7,691,912 B2 | 4/2010 | Ou et al. |
| 7,780,890 B2 | 8/2010 | Lee et al. |
| 8,071,205 B2 | 12/2011 | Tsuchiya et al. |
| 8,153,174 B2 | 4/2012 | Hansen et al. |
| 8,167,085 B2 | 5/2012 | Law et al. |
| 8,214,980 B2 | 7/2012 | Bullock et al. |
| 8,663,774 B2 | 3/2014 | Fernando et al. |
| 9,595,900 B2 | 3/2017 | Lehnamm |
| 11,053,369 B2 | 7/2021 | Evans et al. |
| 11,118,026 B2 | 9/2021 | Evans et al. |
| 2001/0030018 A1 | 10/2001 | Weinstein et al. |
| 2002/0094426 A1 | 7/2002 | Stepanian et al. |
| 2005/0046086 A1 | 3/2005 | Lee et al. |
| 2005/0192366 A1 | 9/2005 | Ou et al. |
| 2005/0192367 A1 | 9/2005 | Ou et al. |
| 2006/0263587 A1 | 11/2006 | Ou et al. |
| 2007/0152363 A1 | 7/2007 | Begag et al. |
| 2007/0259979 A1 | 11/2007 | Lee |
| 2009/0029147 A1 | 1/2009 | Tang et al. |
| 2011/0003106 A1 | 1/2011 | Juneja et al. |
| 2012/0097907 A1 | 4/2012 | Bauer et al. |

FOREIGN PATENT DOCUMENTS

| | | |
|---|---|---|
| CN | 102056971 A | 5/2011 |
| CN | 102356107 A | 2/2012 |
| CN | 103209830 A | 7/2013 |
| EP | 0489319 B2 | 4/1999 |
| GB | 1205572 A | 9/1970 |
| JP | S64-71732 A | 3/1989 |
| JP | H01-289837 A | 11/1989 |
| JP | H08-34678 A | 2/1996 |
| JP | H10-504792 A | 5/1998 |
| JP | H10-253243 A | 9/1998 |
| JP | H10-510888 A | 10/1998 |
| JP | 2003-010572 A | 1/2003 |
| JP | 2004-167761 A | 6/2004 |
| JP | 2004-306571 A | 11/2004 |
| JP | 2004-340420 A | 12/2004 |
| JP | 2006-176790 A | 7/2006 |
| JP | 2007-004585 A | 1/2007 |
| JP | 2007-088972 A | 4/2007 |
| JP | 2009-220480 A | 10/2009 |
| JP | 2009-286817 A | 12/2009 |
| JP | 2010-023359 A | 2/2010 |
| JP | 2010-534188 A | 11/2010 |
| JP | 2011-001841 A | 1/2011 |
| JP | 2011-098573 A | 5/2011 |
| JP | 2011-189747 A | 9/2011 |
| JP | 2011-202303 A | 10/2011 |
| JP | 2013-532739 A | 8/2013 |
| JP | 6629798 B2 | 1/2020 |
| KR | 95-10575 A | 4/1995 |
| KR | 10-2004-0030462 A | 4/2004 |
| KR | 10-2006-0025564 A | 3/2006 |
| KR | 10-2009-0078357 A | 7/2009 |
| KR | 10-2010-0002101 A | 1/2010 |
| KR | 10-2012-0012836 A | 2/2012 |
| KR | 10-1152320 B1 | 6/2012 |
| RU | 2146661 C1 | 3/2000 |

(56) References Cited

FOREIGN PATENT DOCUMENTS

| | | |
|---|---|---|
| RU | 2146662 C1 | 3/2000 |
| RU | 2310702 C2 | 11/2007 |
| WO | 96/27726 A1 | 9/1996 |
| WO | 03/072526 A1 | 9/2003 |
| WO | 2005/113126 A1 | 12/2005 |
| WO | 2008/038429 A1 | 4/2008 |
| WO | 2008/051029 A1 | 5/2008 |
| WO | 2008/099670 A1 | 8/2008 |
| WO | 2011/016962 A2 | 2/2011 |
| WO | 2012/010805 A1 | 1/2012 |

OTHER PUBLICATIONS

European Search Report received in European Patent Application No. 21197252, dated Jan. 10, 2022, 4 pages.
GOST 23307-78 "Vertically stratified mineral wool thermal insulating mats", Publishing and Printing Complex Publishing House for Standards, Moscow, Mar. 14, 2001.

SEGMENTED FLEXIBLE GEL COMPOSITES AND RIGID PANELS MANUFACTURED THEREFROM

CROSS-REFERENCE TO RELATED APPLICATIONS

This application is a continuation of U.S. Nonprovisional patent application Ser. No. 15/367,986, entitled Segmented Flexible Gel Composites and Rigid Panels Manufactured Therefrom," filed Dec. 2, 2016, which is a divisional of U.S. Nonprovisional patent application Ser. No. 13/800,551, entitled Segmented Flexible Gel Composites and Rigid Panels Manufactured Therefrom," filed Mar. 13, 2013, which claims priority to and benefit from U.S. Provisional Patent Application 61/682,198 filed on Aug. 10, 2012; each of which is hereby incorporated by reference in its entirety as if fully set forth, insofar as the incorporated subject matter does not conflict with the subject matter of the current application.

SUMMARY OF THE INVENTION

The present invention describes a process of manufacturing a fiber reinforced gel composite comprising the steps of, providing a segmented fiber batting sheet, combining the batting with a gel precursor, gelling the combination to make a composite, rolling the composite; and drying the composite to make a fiber reinforced gel composite. Additionally, further steps of unrolling the dried composite, applying an adhesive to at least one side of the composite and attaching it to another planar material may be carried out.

Additionally, a process of manufacturing a gel composite panel is described which comprises the steps of, providing a dried, segmented fiber-reinforced gel composite sheet with at least two major surfaces and multiple segmented cross-sectional surfaces, applying an adhesive to at least one surface of said composite; and attaching said composite to another dried, segmented gel composite.

Additionally, a process of manufacturing a reinforced gel composite is described which comprises the steps of, providing a segmented open cell foam sheet, combining the batting with a gel precursor, gelling the combination to make a composite, rolling the composite; and drying the composite to make a reinforced gel composite. The segmented fiber batting or the segmented open cell foam sheet of any of the preceding processes may have a facing layer or facing sheet attached to them. Such facing layers may comprise fibers. The fiber battings or non-wovens of the processes of the present invention may comprise non-continuous fibers or continuous filaments.

Additionally, the above described processes involve the step of incorporating additives into the composite selected from the group consisting of titanium dioxide, iron oxides, carbon black, graphite, aluminum hydroxide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, silicon carbide, molybdenum silicide, manganese oxides, iron titanium oxide, zirconium silicate, zirconium oxide, iron (I) oxide, iron (III) oxide, manganese dioxide, iron titanium oxide (ilmenite), chromium oxide and a combination thereof.

Additionally, the above processes involve the step of adding at least a binder to the fibers or using a fibers or fiber systems comprising at least one binder. The processes of the present invention involve the use of segmented fiber battings with at least one segment being rigid.

Additionally, the processes of the present invention use as gel in the fiber reinforced gel composite, one or more material or derivatives thereof selected from the group consisting of zirconia, yttria, hafnia, alumina, titania, ceria, silica, polyacrylates, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose and combinations thereof.

The fibers in the fiber batting sheet, facing layer or the segmented fiber reinforced gel composites of the present invention comprise one or more materials selected from the group consisting of mineral wool, glass wool, rock wool, fiber glass, polyester, polyolefin terephthalates, poly(ethylene) naphthalate, polycarbonates and Rayon, Nylon, cotton based lycra (manufactured by DuPont), Carbon based fibers like graphite, precursors for carbon fibers like polyacrylonitrile (PAN), oxidized PAN, uncarbonized heat treated PAN such as the one manufactured by SGL carbon, fiberglass based material like S-glass, 901 glass, 902 glass, 475 glass, E-glass, silica based fibers like quartz, quartzel (manufactured by Saint-Gobain), Q-felt (manufactured by Johns Manville), Saffil (manufactured by Saffil), Durablanket (manufactured by Unifrax) and other silica fibers, Polyaramid fibers like Kevalr, Nomex, Sontera (all manufactured by DuPont) Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS and combinations thereof.

Additionally, the processes for making panels described in the present invention make use of one or more of the adhesives selected from the group consisting of potassium water glass, sodium water glass, cement and alkali-activated aluminosilicates, polyethylene, kapton, polyurethane, polyester, natural rubber, synthetic rubber, hypalon, plastic alloys, PTFE, polyvinyl halides, polyester, neoprene, acrylics, nitriles, EPDM, EP, viton, vinyls, vinyl-acetate, ethylene-vinyl acetate, styrene, styrene-acrylates styrene-butadienes, polyvinyl alcohol, polyvinylchloride, acrylamids, phenolics and combinations thereof. The thermal conductivity of the reinforced gel composites made from the above processes is less than 25 mW/mK at ambient conditions.

A segmented fiber reinforced gel composite is described wherein the gel is continuous through the fiber in at least one segment and at least one gap exists between at least two adjoining segments. A gap as described here means there is a discontinuity in both the fiber and the gel of these adjoining segments.

Additionally, a rigid panel is described comprising at least two layers of fiber reinforced gel composites wherein at least one layer comprises segmented fiber reinforced gel composite with at least a gap in both fiber and gel between at least two adjoining segments.

In an embodiment, the gel composites or the panels of the present invention further comprising fillers selected from the group consisting of titanium dioxide, iron oxides, carbon black, graphite, aluminum hydroxide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, silicon carbide, molybdenum silicide, manganese oxides, iron titanium oxide, zirconium silicate, zirconium oxide, iron (I) oxide, iron (III) oxide, manganese dioxide, iron titanium oxide (ilmenite), chromium oxide and a combination thereof. In another embodiment, the panels or composites of the present invention further comprise at least a binder in the fiber structure.

In another embodiment, the segmented fiber batting or segmented open cell foam sheets of the panels or composites of the present invention have a facing layer or sheet attached. The face sheet layer may comprise fibers. The fiber battings of the present invention may comprise non-continuous fibers or continuous filaments or a combination thereof.

Additionally, the panels or composites of the present invention may further comprise additives selected from the group consisting of titanium dioxide, iron oxides, carbon black, graphite, aluminum hydroxide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, silicon carbide, molybdenum silicide, manganese oxides, iron titanium oxide, zirconium silicate, zirconium oxide, iron (I) oxide, iron (III) oxide, manganese dioxide, iron titanium oxide (ilmenite), chromium oxide or a combination thereof.

Additionally, the panels or composites of the present invention may further comprise at least a binder in the fibers or use a fiber comprising at least one binder. At least a segment of the segmented fiber batting may be rigid in the preceding panel or composites.

Additionally, the panels or composites of the present invention have components that are made from the gel precursors of zirconia, yttria, hafnia, alumina, titania, ceria, silica, polyacrylates, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose and combinations thereof.

Additionally, the fibers in the panels or composites of the present invention are selected from the group consisting of mineral wool, glass wool, fiber glass, polyester, polyolefin terephthalates, poly(ethylene) naphthalate, polycarbonates and Rayon, Nylon, cotton based lycra (manufactured by DuPont), Carbon based fibers like graphite, precursors for carbon fibers like polyacrylonitrile (PAN), oxidized PAN, uncarbonized heat treated PAN such as the one manufactured by SGL carbon, fiberglass based material like S-glass, 901 glass, 902 glass, 475 glass, E-glass, silica based fibers like quartz, quartzel (manufactured by Saint-Gobain), Q-felt (manufactured by Johns Manville), Saffil (manufactured by Saffil), Durablanket (manufactured by Unifrax) and other silica fibers, Polyaramid fibers like Kevalr, Nomex, Sontera (all manufactured by DuPont) Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS and combinations thereof.

Additionally, the panels of the present invention include adhesives selected from the group consisting of potassium water glass, sodium water glass, cement and alkali-activated aluminosilicates, polyethylene, kapton, polyurethane, polyester, natural rubber, synthetic rubber, hypalon, plastic alloys, PTFE, polyvinyl halides, polyester, neoprene, acrylics, nitriles, EPDM, EP, viton, vinyls, vinyl-acetate, ethylene-vinyl acetate, styrene, styrene-acrylates styrene-butadienes, polyvinyl alcohol, polyvinylchloride, acrylamids, phenolics and combinations thereof. In an embodiment, the panels or composites of the present invention have an apparent thermal conductivity of less than 25 mW/mK at ambient conditions.

DETAILED DESCRIPTION OF THE INVENTION

The present invention involves manufacturing of rolled insulation products based on aerogels and aerogel-like materials. Aerogels, which exhibit extremely low density, high surface area, good optical, thermal, and acoustic properties, have been explored for various applications. However, aerogels have inherent drawbacks such as weakness and brittleness. Various types of reinforcements may be used to add strength, flexibility and other important properties to aerogels. Fiber reinforced aerogel composites may be made from adding loose fibers or non-woven fiber sheets to the gel precursors, gelling the combination to make a gel sheet, aging the gel sheet and drying the formed gel sheet.

Aerogels, which exhibit extremely low density, high surface area, good optical, thermal, and acoustic properties, have been used previously to try to address this need and other needs for which their properties could be advantageous. However, aerogels have inherent drawbacks such as weakness and brittleness. Notably, when making highly transparent and hydrophobic aerogels, brittleness becomes much more acute, and thus they are more difficult to handle, and require long cycle times for fluid drying in order to avoid cracking.

The weakness and brittleness of low density aerogels can particularly have a negative impact on production scale-up and limit large scale manufacturing. Additionally, aerogels with lower densities may have the best transparency, but also exhibit higher thermal conductivity and thus, exhibit worse insulation performance.

The fragile structure of an aerogel (low density and high porosity) also poses several difficulties in conforming to irregular surfaces, or maintaining integrity in dynamic conditions such as when sandwiched between glass and different thermal expansion coefficients between glass and aerogel results in compressive forces. So, flexibility, compressibility, integrity, durability, strength, and resistance to sintering, dusting and cracking are all areas for potential improvement in aerogels and aerogel composites.

A number of attempts have been made to improve aerogels and aerogel composites to address these problems and take fuller advantage of their remarkable properties as materials. Some patents describe attempts to make composites with foams and particulate aerogels, for example, EP0489319, and U.S. Pat. Nos. 6,136,216; 5,691,392; 6,040,375; and 6,068,882. Others, for example, U.S. Pat. Nos. 4,966,919; 5,037,859; 5,972,254; 5,973,015; and 6,087,407; and US Patent Application Publication No. 2002/0094426 describe other aerogel or aerogel composites with or without foams. Some, such as US Patent Application Publication No. 2005/0192367 and U.S. patent application Ser. No. 11/392,925 describe transparent aerogels or aerogel composites.

Within the context of embodiments of the present invention "aerogels" or "aerogel materials" along with their respective singular forms, refer to gels containing air as a dispersion medium in a broad sense, and gels dried with supercritical fluids in a narrow sense. The chemical composition of aerogels can be inorganic, organic (including polymers) or hybrid organic-inorganic. Inorganic aerogels may be based on Silica, Titania, Zirconia, Alumina, Hafnia, Yttria, Ceria, Carbides and Nitrides. Organic aerogels can be based on compounds including but are not limited to: urethanes, resorcinol formaldehydes, polyimide, polyacrylates, chitosan, polymethylmethacrylate, members of the acrylate family of oligomers, trialkoxysilyl terminated polydimethylsiloxane, polyoxyalkylene, polyurethane, polybutadiane, melamine-formaldehyde, phenol-furfural, a member of the polyether family of materials or combinations thereof. Examples of organic-inorganic hybrid aerogels include, but are not limited to: silica-PMMA, silica-chitosan, silica-polyether or possibly a combination of the aforementioned organic and inorganic compounds. Published US patent applications 2005/0192367 and 2005/0192366 teach extensively of such hybrid organic-inorganic materials and are hereby incorporated by reference in their entirety.

Aerogels applicable to the present invention include such aerogels which are reinforced by a fibrous structure. Such reinforcements provide strength and flexibility to the aerogel structure. U.S. Pat. Nos. 6,068,882, 6,087,407, 6,770,584, 5,124,101, 5,973,015, 6,479,416, 5,789,075, 5,866,027, 5,786,059, 5,972,254, 4,363,738, 4,447,345, PCT application WO9627726, U.S. patent applications 20020094426, 2003077438, Japanese patent JP8034678, U.K. Patent GB1205572 teach some of the aerogel materials that may be practiced with the embodiments of the present invention. These documents are incorporated herein by reference to teach the methods of manufacturing such flexible aerogel materials, at least in part. Flexible aerogel materials can also have form factors that are blankets or thin strips. Although many of the embodiments of the present invention are focused towards coating aerogel composites, they can also be used to coat other forms of aerogels.

Fiber reinforcement when applied appropriately results in flexible aerogel materials. Such flexibility in aerogel materials is desirable in a variety of applications where said aerogel materials can be drop-in-replacements for the existing materials. However, flexibility sometimes may also result in certain damage to the aerogel structure. Though it may not affect other critical properties of aerogel materials, it can present a nuisance to physical handling. The present invention, in many of its embodiments provides methods to minimize the effects of such damage and further prevent any such damaged material from dislodging from the material matrix. Hence, any consequential mechanical handling issues related to aerogel particulate materials on the surface of such aerogel material are avoided and substantially reduced by the methods of the present invention.

It has been shown that the retrofit of existing homes, buildings and structures with insulation possessing high thermal resistance can significantly reduce energy consumption and corresponding $CO_2$ emissions. There has thus been a strong desire to develop aerogel-based insulation materials for the building and construction market. For applications not involving cavity wall and/or lofted attic insulation, a preferred product for this market is rigid panels. For instance, many interior or exterior retrofits of buildings involve the installation of non-flexible board stock such as mineral wool or EPS foam. Over the past decade, there has been a renewed interest in producing rigid panels with thermal insulation materials with greater R-values than that currently on the market. High performance aerogel-based insulation has been of particular interest. Fiber reinforced aerogel insulation is currently commercially available in high volume as a flexible durable composite blanket at thicknesses not exceeding 10 mm. Multiple plies of these materials are typically laminated with adhesives to produce a rigid board of greater thickness. Because flexible aerogel based insulation is necessarily produced as a rolled-good, it may possess a certain degree of winding defects in the form of buckles, undulations and/or thickness variations and as such extensive process and quality control needs to be employed to manage these issues. The presence of these defects makes the lamination of flexible aerogel materials into rigid board stock a challenge. Individual layers of aerogel insulation with surface defects result in an incomplete surface bond due to the inability to attain full surface mating of each individual ply during the lamination process. Panels produced in such a fashion may contain a large number of voids and defects that not only affect mechanical strength but also overall thermal performance. There thus exists a strong need to eliminate the surface defects of these materials that are due mainly to the stresses imposed by winding and unwinding, stresses typically associated with the manufacture of rolled goods. The winding and unwinding process associated with the production of flexible composite aerogel insulation also presents challenges for the use of rigid fibrous based materials as reinforcement for these composites. Fibrous materials with high binder content and/or materials that are rigid cannot sustain the winding/unwinding process of rolled-good manufacture without sustaining copious amounts of defects in the form of delaminations, buckles and/or tears. Due to substantially improved economics, there is a strong desire to enable the use of lower cost fibrous reinforcements with high binder content for the production of flexible aerogel insulation. To date, these types of reinforcement materials are too rigid to be wound around a mandrel with a small radius without imparting non-conformities in the presence of folds, tears and delaminations. As such, there is a need to develop a process that could enable the winding and subsequent aerogel processing of such material without imparting the damage associated with winding. For the purposes of this patent application, a rigid panel means a panel of practical installable surface area (from 0.1 to 10 m$^2$) with the ability to hold its own weight without bending to the extent that it interferes in the practical handling and installation of the panel. While one can make rigid panels by attaching non-rigid planar material to another rigid material, the rigid panel as defined above excludes such attached combinations and the rigid panels of the present invention focuses on one or more gel-composite layers attached through adhesives or otherwise being rigid as described above.

Figure 1:
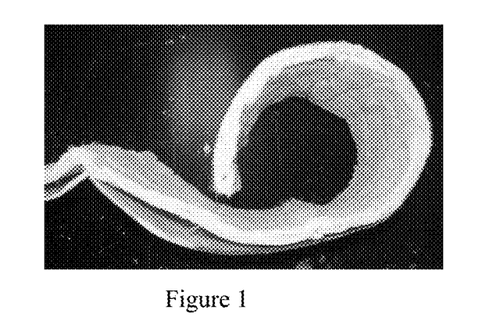
FIG. 1. illustrates aerogel composite produced using a rotary-glass non-woven as-is (without segmentation).

The present invention also describes an efficient method to manufacture flat-panel aerogel-based boards using low-cost fibrous substrates with increased rigidity. Such substrates are not normally amenable to standard processing in a cylindrical vessel for the various processes involved in manufacturing gel composites in rolled good form. Efficient utilization of vessels necessitates the manufacture of fiber reinforced aerogel materials in rolled good form in order to maximize the volume of a cylindrical vessel and reduce the fixed costs associated with production. As such, the fiber reinforcements used to reinforce aerogels need to have sufficient flexibility to sustain winding and unwinding. Materials with excess rigidity and/or materials with high binder content do not normally process well and typically result in the manufacture of aerogel composites with excessive defects in the form of folds, buckles, delaminations and tears (FIG. 1). The final product formed using such rigid reinforcements is thus not amenable to the production of flat-panel board stock, a preferred product form for building and construction applications. The excessive amount of defects in such products diminishes thermal performance, material integrity and severely complicates any fabrication process.

Figure 2:
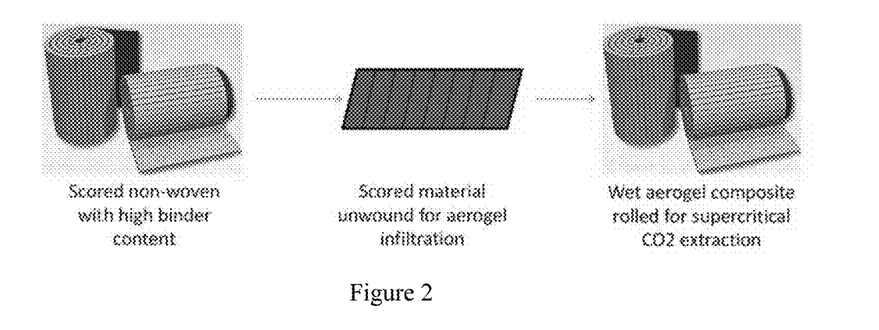
FIG. 2. illustrates schematic depicting the manufacture of aerogel composites using scored non-woven products with increased rigidity.
Figure 3:
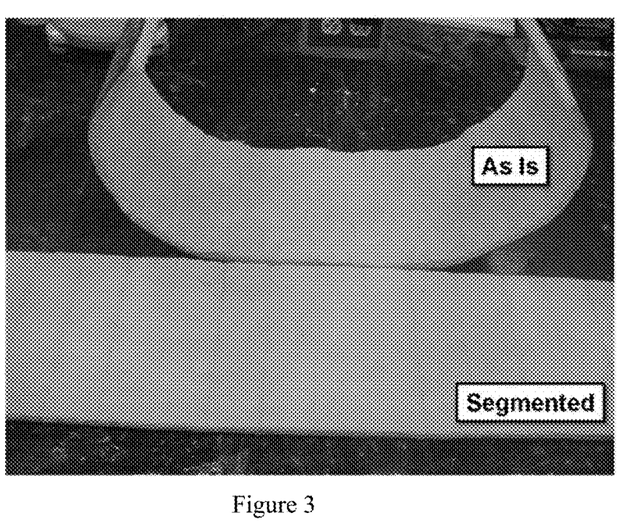
FIG. 3. illustrates a comparison of the dried gel composites produced with non-segmented glass wool sheet (above) and with segmented glass wool sheet (below).

We have discovered that the longitudinal segmentation (across the width of the blanket) of rigid non-woven fiber reinforcement enables sufficient flexibility so that the product can be wound/unwound with minimal delamination or buckling. In another embodiment, a facing sheet is integrated on one side of the blanket to provide additional tensile strength. Segmented non-woven blankets may be prepared by various methods including scoring the non-woven partially across its thickness, attaching separate segments to a face sheet, thus creating a segmented sheet connected together by the face sheet, scoring the non-woven sheet all the way and attaching a face sheet or any other practical ways known in the art. The terms segmentation and scoring are used interchangeably in this document to refer to the process of making segmented sheets in which segments are held together by a face sheet. Alternatively, the scoring (cutting) is performed for less than the thickness of the sheets such that the segmented sheet is still in one piece and held together by the portions through the thickness not cut by the scoring process. Certain scored non-woven sheets are available in the market. An example is a mineral wool non-woven, Isoroll MW from Isolparma S.r.l. The segmented non-woven sheet is carried by a face sheet/veil through the fiber-reinforced aerogel composite production process and the subsequent fabrication of rigid panel—see schematic in FIGS. 2 and 6. The non-woven fiber reinforcement can be efficiently wound in a cylindrical form and any gel-infused sheets manufactured therefrom may be unwound into a flat board-like shape with little to no damage. This allows for the efficient casting of a wet gel/fiber composite using a flat conveyor belt and the winding of the final wet-gel composite to enable efficient utilization in processes involving the use of cylindrical vessels. Alternatively, segmented non-woven sheet may be pre-wound with another non-permeable layer adjoining its major surface and a gel precursor may be infused into the fiber matrix along the axis of the winding, subsequently unwound after gel formation and further processed to produce a dry segmented gel composites. More importantly, most of the visible air gaps in the gel composite as produced in the cylindrical form, between adjoining segments, effectively disappear upon unwinding into flat stock, ensuring that thermal performance of a typical aerogel-fiber composite is maintained. The final material can be unwound into a near perfect flat panel, enabling the efficient production of rigid panels or aerogel-based boards suitable for building and construction applications. What was surprising and unexpected was that when wound (either as wet or dry gel), the gaps, i.e. gaps between two adjoining segments separated in a clean line without shattering the wet or dried gel. Aerogels and other dried gels made from the gel precursors described in the present invention are fragile material that when subjected to any stress are prone to crack and shatter. However, what we have found here is a process where the dried gels can be broken in clean lines at the gaps such that when subsequently unwound, they produce a substantially planar surface. This allows for efficient manufacturing of flat panels. Furthermore, individual segments are still rigid, even if they are amenable to be wound and unwound. This segment rigidity allows for the manufacturing of rigid panels with two or more of such manufactured fiber reinforced gel composite sheets using adhesives of various kind, using a non-adhesive mechanical fasteners, needling of the produced composites or sewing them using extraneous fibers.

Figure 4:
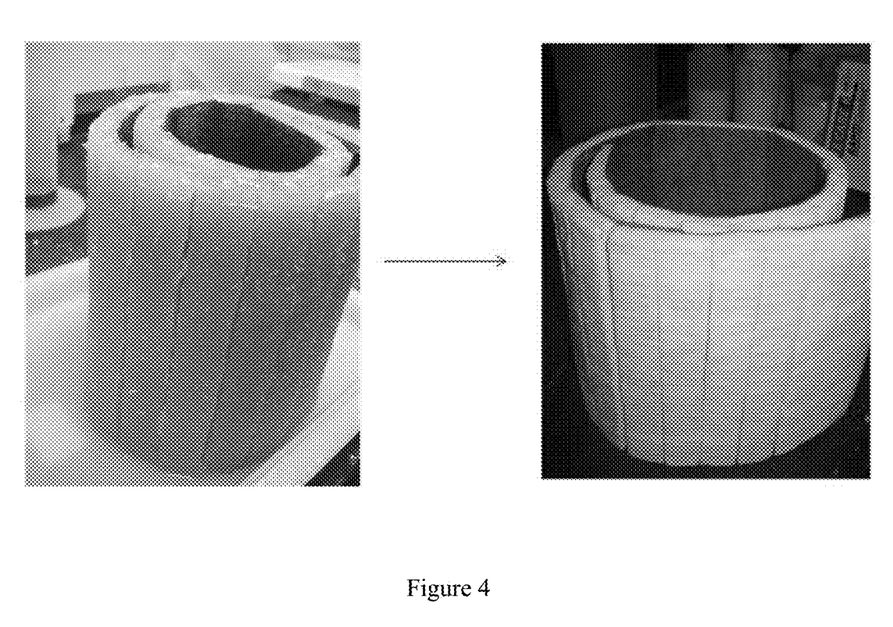
FIG. 4. illustrates segmented wet gel composite and the segmented dry gel composite.

We have reduced this invention to practice by producing small scale rolls of aerogel composites measuring 36" length and 8" width. Specifically, we have used segmented rotary-glass based glass wool sheet, to produce gel composite materials in a rolled good process. The non-woven and the gel composites were wound around a mandrel of 6" diameter. Using standard silica aerogel precursors (Tetraethoxysilane and its derivatives), wet gel composites were produced using this glass wool sheet (scored or segmented at 1 or 2" intervals along its length) and were subsequently rolled around a 6" diameter after a 12 minute period of syneresis. Upon winding, the wet gel cleanly fractures at the scores (or segmentations) to enable flexibility and maintain the integrity of the fiber/aerogel segments (FIG. 4).

Figure 5:
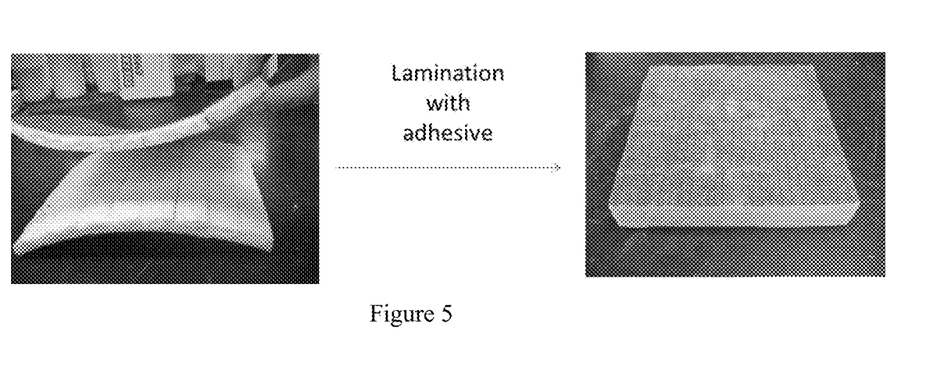
FIG. 5. illustrates panelization of segmented aerogel/fiber composite into Board stock.

The wound wet gel/fiber composite is now amenable to processing in a cylindrical vessel for aging, rinsing and supercritical CO2 extraction and is in an ideal shape to maximize the volume of a cylindrical vessel. After removal of solvent via supercritical CO2 extraction, the material maintains sufficient flexibility such that it can be unwound into flat stock (Figure ?). In contrast to aerogel composites produced with non-segmented glass wool sheet of the same type, the use of a segmented glass wool sheet has significantly reduced/eliminated any material defects associated with winding and unwinding steps. The segmented gel composite maintains flexibility such that it can be unwound and panelized to produce a board stock (FIGS. 4, 5 and 6).

We have also successfully demonstrated that the use of the segmented aerogel/fiber composite can be used to produce flat board stock using inorganic or organic adhesives. Specifically, we have produced prototypes using potassium silicate adhesives and two plies of segmented aerogel/fiber composites. The original purpose of the face sheet in the raw fiber reinforcement was to provide improved tensile strength and a carrier for the segments of fiber, but we have also discovered that such face sheet can now be oriented outwards to provide some level of dust containment for the final aerogel board stock.

Aerogel production processes involving the use of high pressures necessarily involve cylindrical pressure vessels. Even low pressure steps such as aging or rinsing are efficiently carried out using cylindrical vessels. Fluid handling is easier in cylindrical vessels than vessels of any other shape. In order to fully maximize the use a cylindrical vessel, one must process a flexible gel composite such that it adopts a cylindrical-like shape and thus fills any vessel to nearly 100% of the available volume. In order to accomplish this, the fiber reinforcement of the aerogel composite must be able to sustain winding and unwinding and must conform without failure to small radius on the order of 3-18 inches. The present invention enables non-woven fiber reinforcements that are sufficiently rigid, or non-woven fiber reinforcements typically containing appreciable amounts of binder to be used as reinforcements for manufacturing aerogel/fiber composites. Because these non-woven materials are typically lower in cost than the other types of non-wovens (i.e. needlepunched), the present invention has the capability of substantially lowering the cost of fiber-reinforced gel composite insulation.

Figure 6:
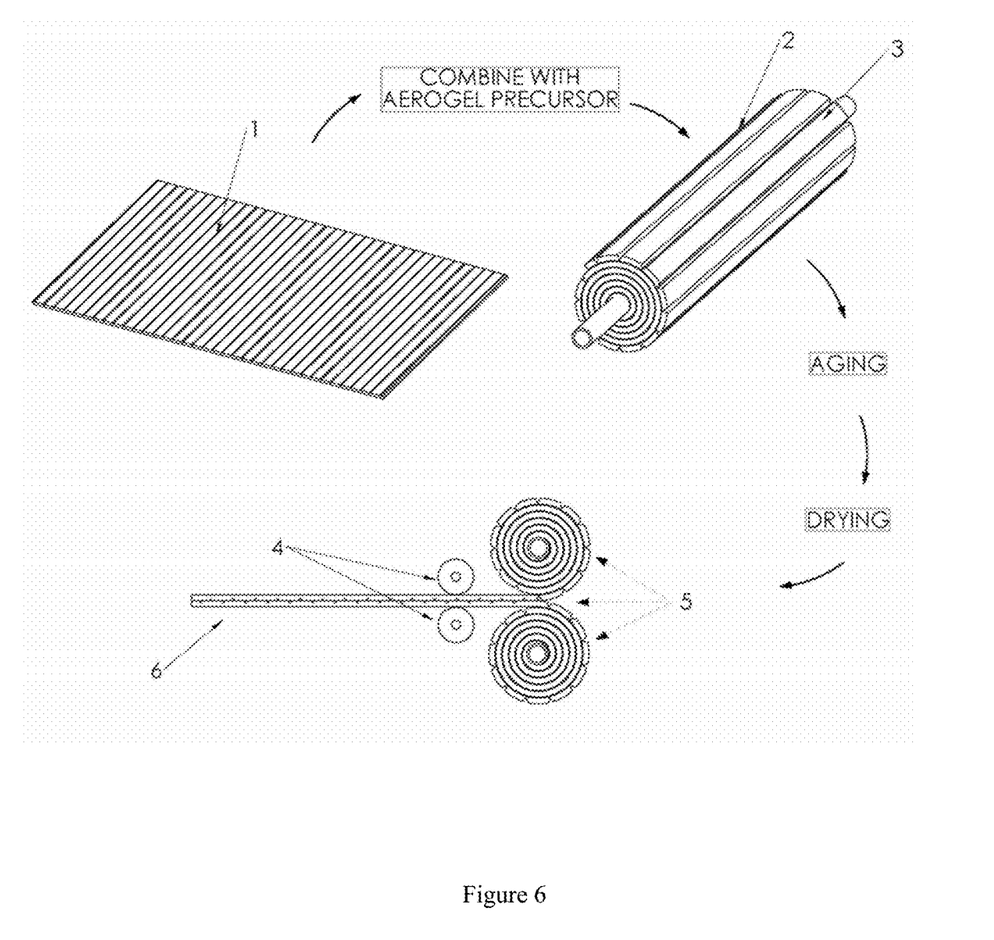
FIG. 6. illustrates manufacturing of rigid panels starting from segmented fiber-reinforcement sheets and gel precursors.

In another embodiment, an integrated process is provided for making a rigid panel from segmented non-woven reinforcement materials (FIG. 6). A segmented non-woven sheet (1) is unrolled onto a moving conveyer belt and gel precursor in a liquid form is applied on top of the unrolled non-woven and allowed to infuse into the non-woven to become a gel sheet during its travel through the conveyor belt. At the end of the conveyor belt, the gel-infused non-woven (a wet gel composite sheet) is rolled onto a mandrel (2). This rolling may visibly show the gaps between the segments. Thus rolled wet gel composite is transferred to a vessel to allow the aging to take place resulting in a gel composite with various desired strength and other properties. Optionally, the rolls may be rinsed with a solvent and in yet another embodiment treated with hydrophobic agents to impart surface hydrophobicity. The roll is subsequently dried using various methods including ambient pressure, subcritical, supercritical carbon dioxide drying. The dried gel may be optionally carried through an oven to further remove any residual solvent or water. Thus dried two gel composite rolls are unrolled as illustrated in the FIG. 5 (bottom) with segmented side of the sheets simultaneously applied with an adhesive (5). The adhesive may be an organic or an inorganic adhesive. After the application of the adhesive, the rolls are joined together and passed between a pair of rotating nip rollers where the two gel-composite layers are compressed together. Additional nip rollers (4) may be added to this set up depending on the adhesive used and the compression needed to make the sheets into rigid panels (6). Thus formed rigid panels may be cut into desired sizes and packaged for shipment or for additional inspection and further processing or drying as appropriate.

Figure 7:
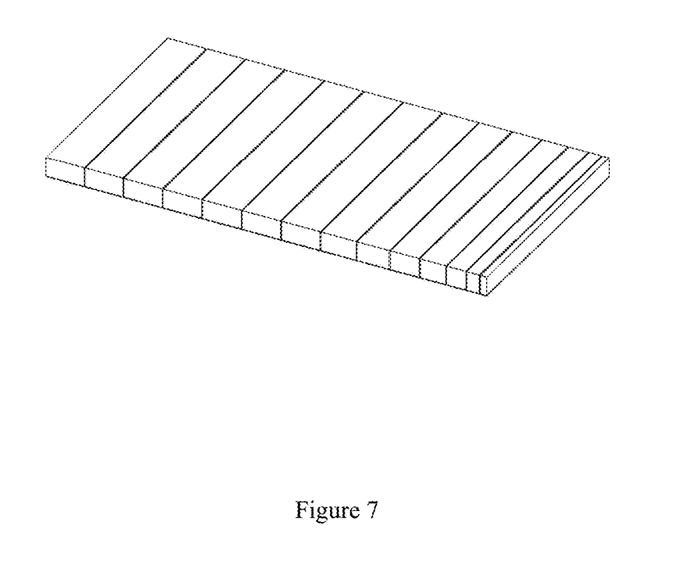
FIG. 7. illustrates an alternative embodiment of the fiber reinforcement where there is a gradual change in segment sizes along the length of the fiber reinforcement

In another embodiment, the segmented fiber reinforcement sheet may be prepared such that the size of the segments along the length are not uniform. Specifically, the segment sizes may be gradually increased. This helps in winding the gel-sheets prepared from such reinforcement sheets where winding creates a gradually increasing radius of curvature. A segmented fiber reinforcement sheet illustrating this embodiment is shown in FIG. 7.

In another embodiment, instead of using a segmented fiber reinforcement sheet, a non-segmented or partially segmented reinforcement sheet may be used to make a gel sheet which may be segmented after the gel sheet is made. In this case, a rigid or moderately rigid fiber reinforcement sheet may be combined with gel precursors and allowed to gel as a gel sheet. Such gel sheet may be scored (or cut) such that segmentations area created in the gel sheet. On winding, this segmented gel sheet behaves similar to the segmented gel sheets made from segmented fiber reinforcement. Alternatively, even when a segmented fiber reinforcement is used, a scoring or cutting step may be employed after it is made into a gel sheet to obtain clean edges of segment gaps.

The segmented reinforcement in a sheet form useful in the present invention may be of several types. Non-wovens of several types made with continuous fibers, or chopped fibers may be used. When chopped fibers are used, in some embodiments, the non-woven may contain binders. In another embodiment, the non-woven sheets useful in the present invention may be needle-punched to form felt-like materials. The above described materials may be segmented by scoring them across their thickness using a knife, hot knife, saw blade or any other scoring technique known in the art. The fibers useful to prepare the fiber-reinforcements of the present invention includes, mineral wool, glass wool, fiber glass, polyester, polyolefin terephthalates, poly(ethylene) naphthalate, polycarbonates and Rayon, Nylon, cotton based lycra (manufactured by DuPont), Carbon based fibers like graphite, precursors for carbon fibers like polyacrylonitrile (PAN), oxidized PAN, uncarbonized heat treated PAN such as the one manufactured by SGL carbon, fiberglass based material like S-glass, 901 glass, 902 glass, 475 glass, E-glass, silica based fibers like quartz, quartzel (manufactured by Saint-Gobain), Q-felt (manufactured by Johns Manville), Saffil (manufactured by Saffil), Durablanket (manufactured by Unifrax) and other silica fibers, Polyaramid fibers like Kevalr, Nomex, Sontera (all manufactured by DuPont) Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS and combinations thereof.

In addition to the fiber materials described in the present invention, foam materials and in specific embodiments, rigid foam boards may be made into segmented sheets using a face sheet and processed using the techniques described in this application, thus produced gel-foam rigid composite sheets that may be further be made into rigid panels as described above. In another embodiment, the foam materials may be open pore foams.

In general, the gel precursors useful in the present invention comprise metal oxides that are compatible with the sol-gel process where upon polymerization form a gel network(s). The silica precursors used may be chosen from but are not limited to: alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, or combinations thereof. TEOS, partially hydrolyzed polyethysilicates, and polyethylsilicates are some of the more common commercially available silica precursors. The fillers may be dispensed in the gel precursor solution at any point before a gel is formed. Gel formation may be viewed as the point where a solution (or mixture) exhibits resistance to flow and/or forms a continuous polymeric network throughout its volume. Preferably the mixture comprising fillers and precursors is a homogenous solution, conducive to gel formation. In addition to the silica based precursors, precursors of zirconia, yttria, hafnia, alumina, titania, ceria are useful. In additional embodiments, organic precursors such as polyacrylates, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose and combinations of the above may be used as gel precursors in the present invention. Additionally, hybrid organic-inorganic gel precursors with various combinations of the species described above may be used.

Suitable solvents for use herein include: lower alcohols with 1 to 6 carbon atoms, preferably 2 to 4, although other solvents can be used as is known in the art. Ethanol, is typically a favored solvent used. Examples of other useful solvents include but are not limited to: ethyl acetate, ethyl acetoacetate, acetone, dichloromethane, tetrahydrofuran, methanol, isopropyl alcohol and the like. Of course in order to achieve a desired level of dispersion or solution certain gel precursor/filler systems, or a multi-solvent approach may be required.

Generally, gels may be formed via maintaining the mixture in a quiescent state for a sufficient period of time, changing the pH of the solution, directing a form of energy onto the mixture, or a combination thereof. Exemplary forms of energy include: a controlled flux of electromagnetic (ultraviolet, visible, infrared, microwave), acoustic (ultrasound), or particle radiation. In the present invention the gel is formed after the gel precursor is combined with the segmented reinforcements of the present invention.

Gels may be additionally aged prior to drying to further strengthen the gel structure by increasing the number of cross-linkages. This procedure is useful for preventing potential volume loss during drying, or simply a stronger final gel. Aging can involve: maintaining the gel (prior to drying) at a quiescent state for an extended period, maintaining the gel at elevated temperatures, addition of cross-linkage promoting compounds or any combination thereof. Aging time period typically requires between about 1 hr and several days. The preferred temperatures are usually between about 10° C. and about 100° C. Additionally, surface hydrophobicity imparting agents such as hexamethyldisilazane, hexamethyldisiloxane, trimethylethoxysilane, methylethoxysilane, methylmethoxy silane, propyltriethoxysilane, propyltrimethoxysilane, trimethylchlorosilane, trimethylmethoxysilane, triethylethoxysilane, tri-ethyl-methoxysilane, dimethyldichlorosilane, dimethyldiethoxysilane, methyltrichlorosilane, ethyltrichlorosilane, may be used to render the gel/fiber composites hydrophobic. Such agents may be mixed with a solvent such as the solvent used in the prior steps and flowed through the rolled gel sheets during the aging step as described above.

Drying plays an important role in engineering the properties of aerogels, such as porosity and density which influence the material thermal conductivity. To date, numerous drying methods have been explored. U.S. Pat. No. 6,670,402 teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. Also, U.S. Pat. No. 5,420,168 describes a process whereby Resorcinol/Formaldehyde aerogels can be manufactured using a simple air drying procedure. Finally, U.S. Pat. No. 5,565,142 herein incorporated by reference describes subcritical drying techniques. The embodiments of the present invention can be practiced with drying using any of the above techniques. In some embodiments, it is preferred that the drying is performed at vacuum to below super-critical pressures (pressures below the critical pressure of the fluid present in the gel at some point) and optionally using surface modifying agents. In another embodiment, the drying is accomplished using supercritical CO2. Thus dried gel-fiber composites may be further dried by passing through an oven at elevated temperatures.

Various performance enhancing additives may be added to the gel-precursor before the gel is formed in the various embodiments of the present invention. They include of titanium dioxide, iron oxides, carbon black, graphite, aluminum hydroxide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, silicon carbide, molybdenum silicide, manganese oxides, iron titanium oxide, zirconium silicate, zirconium oxide, iron (I) oxide, iron (III) oxide, manganese dioxide, iron titanium oxide (ilmenite), chromium oxide and a combination thereof.

EXAMPLES

The following example illustrates the preparation and performance of a segmented gel-fiber composites and an aerogel-based rigid panel in accordance with the above invention. Precise longitudinal segmentation of a commercially available glass wool non-woven sheet with an integrated face sheet, was accomplished via the use of utility knife or automated rotary tool in combination with a custom produced cutting jig aimed at accomplishing a cut depth of no less than 90% of the original thickness. Using this method, segmented glass wool sheets measuring 36"×8" were produced with both 1" and 2" segments. A requisite amount of a soluble silica source (i.e. sol comprising hydrolyzed tetraethoxysilane and its derivatives) and condensation catalyst, aqueous ammonium hydroxide, were combined and allowed to penetrate the glass-wool non-woven sheet in a horizontal/flat configuration. After a syneresis period of 15 minutes the gel/fiber composite was wound around a mandrel possessing a 6" diameter. The rolling of such a composite was accomplished by ensuring that the segment gaps were facing away from the mandrel during winding. In such a way, the stresses of winding were relieved as gaps are formed along each segmentation. The gel/fiber composite in the cylindrical form was then subject to a period of aging in which the rolled composite was exposed to a hot ethanol solution of ammonium hydroxide and a hydrophobic agent containing alkyl and silyl groups (hexamethyldisilazane). After aging, the rolled composite was transferred to a cylindrical pressure vessel and was then dried using supercritical $CO_2$ extraction to remove the solvent.

The composite was then treated with heat to remove any residual moisture and/or volatiles. The material was then unwound horizontally to adopt a flat configuration. The heat treatment may also be applied after the composite was unrolled. After unwinding the composite, an organic based adhesive (Spray 78 or FastBond) was spray applied (to the aerogel side) at a nominal coat weight of 20-40 g/m2. A second piece of segmented gel/fiber composite, processed in the same manner was then attached to the first piece such that the segmentations are staggered and that the face sheets are orientated away from the bonding face. The material was then subject to a short period of compressive stress (<0.25 PSI) to ensure complete mating and curing of the adhesive. The compressive stress was then relieved and the resulting rigid panel was characterized for thermal conductivity. The following table provides the measured thermal conductivity of the rigid panels thus formed at two different temperatures while under a slight pressure of 2 psi.

|  | Thermal Conductivity (mW/mK) | |
| --- | --- | --- |
| Segment Size | 10° C. | 37.5° C. |
| 1" | 14.7 | 16.1 |
| 2" | 14.7 | 15.8 |

Example 2

One can also fabricate the segmented fiber reinforcements described above using any combination of binder containing fiber reinforcement and lightweight face sheets. For instance, a series of segmented fiber reinforcements suitable for aerogel production were produced using Knauf Batt Insulation (0.5", 2 lb/ft3) and a glass veil face sheet with a density of 10 g/m2. These fiber reinforcements were fabricated using a two-step process involving the initial lamination of the face sheet to one side of the fiberglass batt using an acrylic based adhesive (Fastbond) along the entire length of the insulation batt, followed by a precise longitudinal segmentation to no less than 90% of the original thickness using a utility knife and/or automated rotary tool. The longitudinal segmentation was carried out in such a fashion to leave the laminated face sheet intact. Segmentation length was varied between 1" and 6".

Using such pre-fabricated segmented materials, a series of aerogel composites measuring 12"×24" were prepared in a horizontal configuration. Infiltration of a requisite amount of soluble silica source (i.e. sol comprising hydrolyzed tetraethoxysilane and its derivatives) and a suitable condensation catalyst were allowed to penetrate the fiber reinforcement pre-fabricated at a segmentation interval of 2 inches. After a syneresis period of 15 minutes the gel/fiber composite was wound around a mandrel possessing a 6" diameter. The rolling of such a composite was accomplished by ensuring that the segment gaps were facing away from the mandrel during winding. In such a way, the stresses of winding were relieved as gaps are formed along each segmentation. The gel/fiber composite in the cylindrical form was then subject to a period of aging in which the rolled composite was exposed to a hot ethanol solution of ammonium hydroxide and a hydrophobic agent containing alkyl and silyl groups (hexamethyldisilazane). After aging, the rolled composite was transferred to a cylindrical pressure vessel and was then dried using supercritical $CO_2$ extraction to remove the solvent. The composite was then treated with heat to remove any residual moisture and/or volatiles. The dried aerogel material was then unwound horizontally to adopt a flat configuration. After unwinding the composite, an organic based adhesive (Spray 78 or FastBond that may be obtained from 3M, Minneapolis, Minn.) was spray applied (to the aerogel side) at a nominal coat weight of 20-40 g/m2. A second piece of segmented gel/fiber composite, processed in the same manner was then attached to the first piece such that the segmentations are staggered and that the face sheets are orientated away from the bonding face. The material was then subject to a short period of compressive stress (<0.25 PSI) to ensure complete mating and curing of the adhesive. The compressive stress was then relieved and the resulting rigid panel was characterized for thermal conductivity. The following table provides the measured thermal conductivity of the rigid panels produced in quadruplicate at two different mean test temperatures.

| ID | Thickness (mm) | Thermal Conductivity at 10 C. (mW/mK) | Thermal Conductivity at 37.5 C. (mW/mK) |
| --- | --- | --- | --- |
| Segmented Knauf Panel 1 | 23.9 | 14.1 | 15.3 |
| Segmented Knauf Panel 2 | 23.9 | 14.7 | 16.6 |
| Segmented Knauf Panel 3 | 24.2 | 14.6 | 17.1 |
| Segmented Knauf Panel 4 | 24.9 | 14.4 | 16.3 |

Example 3

Prefabricated segmented reinforcements is produced via the lamination of discontinuous pieces of fiber reinforcement to a suitable lightweight face sheet. A wide range of materials such as mineral wool slab, fiberglass batts, or rigid open celled-foams are cut longitudinally into discontinuous pieces at the preferred segmentation intervals of 1" to 6" and then laminated to a suitable face sheet to produce a segmented product suitable for aerogel production as described above in Example 1. Aerogel products and panels are produced with such reinforcements using the techniques outlined in Examples 1-2.

Example 4

The lightweight fibrous face sheets used in examples 1-3 is alternatively replaced with any chemically compatible polymeric films/laminates. Laminates with thermoplastic tie layers are heat set to a single side of continuous batts of fibrous insulation followed a precise longitudinal segmentation to a depth of no less than 90% of the original thickness. Polymeric films are applied via the application of a non-aqueous or aqueous coating, followed by appropriate cure methods to form a substantially continuous polymeric film with a suitable thickness. Longitudinal segmentation is conducted after film formation to produce segmented fiber reinforcement suitable for aerogel production using the experimental techniques outlined in Examples 1-2.

The invention claimed is:

1. A reinforced aerogel composite sheet comprising an aerogel and a segmented reinforcement sheet, wherein
 the segmented reinforcement sheet has a length, a width, and a thickness, and
 the segmented reinforcement sheet is fully segmented through the thickness across the entire width of the segmented reinforcement sheet.

2. The reinforced aerogel composite sheet of claim 1, wherein the aerogel has a continuous network through at least one segment of the segmented reinforcement sheet.

3. The reinforced aerogel composite sheet of claim 1, wherein the aerogel comprises a material selected from the group consisting of zirconia, yttria, hafnia, alumina, titania, ceria, silica, polyacrylates, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose and combinations thereof.

4. The reinforced aerogel composite sheet of claim 1, wherein the aerogel comprises silica.

5. The reinforced aerogel composite sheet of claim 1, wherein the segmented reinforcement sheet includes a facing layer or sheet attached thereto.

6. The reinforced aerogel composite sheet of claim 5, wherein the facing layer provides additional tensile strength to and dust containment for the aerogel composite sheet.

7. The reinforced aerogel composite sheet of claim 5, wherein the facing layer comprises fibers or glass veil.

8. The reinforced aerogel composite sheet of claim 1, wherein the segmented reinforcement sheet comprises a segmented fiber reinforcement sheet or a segmented open-cell foam reinforcement sheet.

9. The reinforced aerogel composite sheet of claim 1, wherein the segmented reinforcement sheet comprises a non-woven sheet.

10. The reinforced aerogel composite sheet of claim 1, wherein the segmented reinforcement sheet comprises non-continuous fibers.

11. The reinforced aerogel composite sheet of claim 1, wherein the segmented reinforcement sheet comprises continuous fibers or chopped fibers.

12. The reinforced aerogel composite sheet of claim 1, wherein the segmented reinforcement sheet comprises fiber materials selected from the group consisting of mineral wool, glass wool, fiber glass, polyester, polyolefin terephthalates, poly(ethylene) naphthalate, polycarbonates, regenerated cellulose fiber, aliphatic or semi-aromatic polyamides, cotton based polyester-polyurea copolymer, Carbon based fibers, graphite, polyacrylonitrile (PAN), oxidized PAN, uncarbonized heat treated PAN, fiberglass based material, E-glass, silica based fibers, quartz, Polyaramid fibers, polyolefins, polypropylene fibers, fluoropolymers, polytetrafluoroethylene (PTFE), Silicon carbide fibers, ceramic, Acrylic polymers, fibers of wool, silk, hemp, leather, suede, poly(p-phenylene-2,6-benzobisoxazole) (PBO), Liquid crystal material, Polyurethanes, polyamaides, Wood fibers, Boron, Aluminum, Iron, Stainless Steel fibers, polyether ether ketone (PEEK), polyether sulfone (PES), polyetherimide (PEI), polyether ketone (PEK), poly(p-phenylene sulfide) (PPS) and combinations thereof.

13. The reinforced aerogel composite sheet of claim 1, wherein the segmented reinforcement sheet comprises glass fiber or E-glass fiber.

14. The reinforced aerogel composite sheet of claim 1, further comprising at least a binder in the fibers of the fiber reinforcement sheet or comprising a fiber reinforcement sheet comprising at least one binder.

15. The reinforced aerogel composite sheet of claim 1, wherein the segmented reinforcement sheet comprises foam materials selected from the group consisting of polyurethanes, isocyanate-based materials, polyisocyanurates, polyimides, polyvinyl chloride, Styrofoam, silicones, polyolefins, epoxies, urea-formaldehyde, latex rubber, fluoropolymers and syntactic foams.

16. The reinforced aerogel composite sheet of claim 1, further comprising additives selected from the group consisting of titanium dioxide, iron oxides, carbon black, graphite, aluminum hydroxide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, silicon carbide, molybdenum silicide, manganese oxides, iron titanium oxide, zirconium silicate, zirconium oxide, iron (I) oxide, iron (III) oxide, manganese dioxide, iron titanium oxide (ilmenite), chromium oxide, and a combination thereof.

17. The reinforced aerogel composite sheet of claim 1, further comprising silicon carbide.

18. The reinforced aerogel composite sheet of claim 1, wherein at least a segment of the segmented reinforcement sheet is rigid.

19. The reinforced aerogel composite sheet of claim 1, wherein the thermal conductivity of the reinforced aerogel composite sheet is less than 25 mW/mK at 37.5° C. and ambient pressure conditions.

20. The reinforced aerogel composite sheet of claim 1, wherein at least one gap exists between at least two adjoining segments, the at least one gap extending across the width of the reinforced aerogel composite sheet.

21. The reinforced aerogel composite sheet of claim 20, wherein the at least one gap includes discontinuity in at least the reinforcement sheet.

22. The reinforced aerogel composite sheet of claim 20, wherein the at least one gap which exists between at least two adjoining segments extends across the entire width of the reinforced aerogel composite sheet.

23. The reinforced aerogel composite sheet of claim 1, wherein the reinforced aerogel composite sheet is needled or sewn.

24. A panel comprising at least two layers of the reinforced aerogel composite sheet of claim 1.

25. The panel of claim 24, wherein the at least two layers are needled or sewn.

26. The panel of claim 24, wherein the at least two layers are compressed together.

27. The panel of claim 24, further comprising an adhesive, wherein the adhesive is selected from the group consisting of potassium water glass, sodium water glass, cement and alkali-activated aluminosilicates, polyethylene, kapton, polyurethane, polyester, natural rubber, synthetic rubber, hypalon, plastic alloys, PTFE, polyvinyl halides, polyester, neoprene, acrylics, nitriles, EPDM, EP, viton, vinyls, vinyl-acetate, ethylene-vinyl acetate, styrene, styrene-acrylates styrene-butadienes, polyvinyl alcohol, polyvinylchloride, acrylamids, phenolics and combinations thereof.

28. A panel comprising at least one layer of the reinforced aerogel composite sheet of claim 1.

29. The panel of claim 28, wherein the reinforced aerogel composite sheet is needled or sewn.

30. A panel comprising at least a first reinforced aerogel composite and a second reinforced aerogel composite, wherein the first reinforced aerogel composite comprises a reinforced aerogel composite sheet, the reinforced aerogel composite sheet comprising an aerogel and a segmented reinforcement sheet, wherein
at least one gap exists between at least two adjoining segments with discontinuity in at least the reinforcement sheet, and
the at least one gap faces the second reinforced aerogel composite;
the segmented reinforcement sheet has a length, a width, and a thickness,
the segmented reinforcement sheet is fully segmented through the thickness across the entire width of the segmented reinforcement sheet.

31. The panel of claim 30, wherein the aerogel has a continuous network through at least one segment of the segmented reinforcement sheet.

32. The panel of claim 30, wherein the segmented reinforcement sheet comprises a segmented fiber reinforcement sheet or a segmented open-cell foam reinforcement sheet.

33. The panel of claim 30, wherein the aerogel comprises a material selected from the group consisting of zirconia, yttria, hafnia, alumina, titania, ceria, silica, polyacrylates, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, and agarose and combinations thereof.

34. The panel of claim 30, wherein the aerogel comprises silica.

35. The panel of claim 30, wherein the thermal conductivity of at least one of the first reinforced aerogel composite or the second reinforced aerogel composite is less than 25 mW/mK at ambient conditions.

36. The panel of claim 30, wherein at least one of the first reinforced aerogel composite and the second reinforced aerogel composite further comprises additives selected from the group consisting of titanium dioxide, iron oxides, carbon black, graphite, aluminum hydroxide, phosphates, borates, metal silicates, metallocenes, molybdates, stannates, hydroxides, carbonates, zinc oxides, aluminum oxides, antimony oxides, magnesium-zinc blends, magnesium-zinc-antimony blends, silicon carbide, molybdenum silicide, manganese oxides, iron titanium oxide, zirconium silicate, zirconium oxide, iron (I) oxide, iron (III) oxide, manganese dioxide, iron titanium oxide (ilmenite), chromium oxide, and a combination thereof.

37. The panel of claim 30, wherein at least one of the first reinforced aerogel composite and the second reinforced aerogel composite includes silicon carbide.

38. The panel of claim 30, further comprising an adhesive, wherein the adhesive is selected from the group consisting of potassium water glass, sodium water glass, cement and alkali-activated aluminosilicates, polyethylene, kapton, polyurethane, polyester, natural rubber, synthetic rubber, hypalon, plastic alloys, PTFE, polyvinyl halides, polyester, neoprene, acrylics, nitriles, EPDM, EP, viton, vinyls, vinyl-acetate, ethylene-vinyl acetate, styrene, styrene-acrylates styrene-butadienes, polyvinyl alcohol, polyvinylchloride, acrylamids, phenolics and combinations thereof.

39. The panel of claim 30, wherein at least one of the first reinforced aerogel composite and the second reinforced aerogel composite is needled or sewn.

40. The panel of claim 30, wherein the first reinforced aerogel composite and the second reinforced aerogel composite are compressed together.

* * * * *